US009257826B2

(12) United States Patent
Ho

(10) Patent No.: US 9,257,826 B2
(45) Date of Patent: Feb. 9, 2016

(54) CABLE ORGANIZING APPARATUS

(71) Applicant: Oxti Corporation, Taipei (TW)

(72) Inventor: Chih Feng Ho, Taipei (TW)

(73) Assignee: Oxti Corporation, Chungho, Taipei (TW)

( * ) Notice: Subject to any disclaimer, the term of this patent is extended or adjusted under 35 U.S.C. 154(b) by 236 days.

(21) Appl. No.: 14/103,969

(22) Filed: Dec. 12, 2013

(65) Prior Publication Data
US 2015/0171611 A1    Jun. 18, 2015

(51) Int. Cl.
H02G 11/00 (2006.01)
H02G 3/04 (2006.01)
B65H 75/44 (2006.01)

(52) U.S. Cl.
CPC ........... *H02G 11/00* (2013.01); *B65H 75/4473* (2013.01); *H02G 3/0481* (2013.01); *B65H 2701/34* (2013.01)

(58) Field of Classification Search
CPC .............. Y10T 24/388; Y10T 24/3929; Y10T 24/3916; B65H 75/38; H02G 11/00; H02G 3/0481
See application file for complete search history.

(56) References Cited

U.S. PATENT DOCUMENTS

| 4,721,268 | A | 1/1988 | Lerner et al. |
| 4,979,614 | A * | 12/1990 | Ruhaut ..................... 174/135 |
| 6,301,752 | B1 * | 10/2001 | Koppang .................. 24/115 M |
| 6,736,669 | B1 | 5/2004 | Martin et al. |
| 7,433,571 | B2 | 10/2008 | Kendricks |
| 7,438,964 | B2 * | 10/2008 | Clark ........................ 428/40.1 |
| 7,446,260 | B2 | 11/2008 | Hammonds |
| 7,607,618 | B2 | 10/2009 | Mori et al. |
| 7,854,989 | B2 * | 12/2010 | Yabe et al. .................. 428/343 |
| 7,882,660 | B2 | 2/2011 | Kitagawa |
| 8,076,584 | B2 | 12/2011 | Huang et al. |
| 8,502,069 | B2 * | 8/2013 | Holland et al. .............. 174/36 |
| 2002/0074152 | A1 * | 6/2002 | Rockney et al. ......... 174/102 R |
| 2010/0122834 | A1 * | 5/2010 | Chang ........................ 174/135 |
| 2013/0212838 | A1 * | 8/2013 | Mask et al. ................ 24/115 A |
| 2014/0076604 | A1 * | 3/2014 | Frye ............................ 174/68.3 |

* cited by examiner

Primary Examiner — Robert J Sandy
(74) Attorney, Agent, or Firm — Charles E. Baxley

(57) ABSTRACT

A cable organizing apparatus includes a housing member having a base member, one or more posts extended from the base member for winding or engaging with one or more cables, and one or more flaps extended outwardly from the base member and foldable relative to the base member for forming and defining a chamber in the flaps of the housing member and for receiving and accommodating the post within the chamber in the flaps of the housing member, and the flaps are foldable relative to the base member for receiving the post and the cable within the chamber in the flaps of the housing member and for preventing the cable from being disengaged from the post.

4 Claims, 4 Drawing Sheets

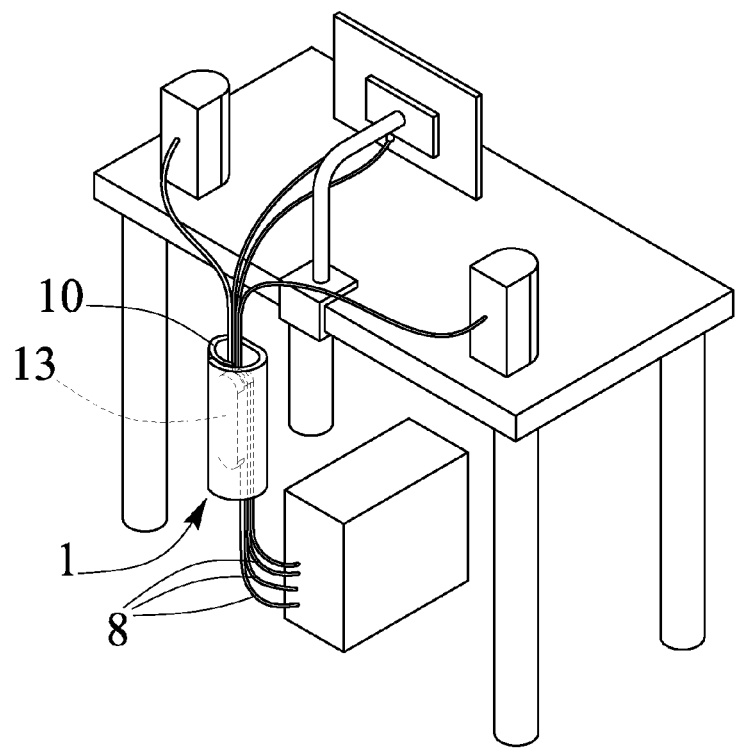
F I G. 1
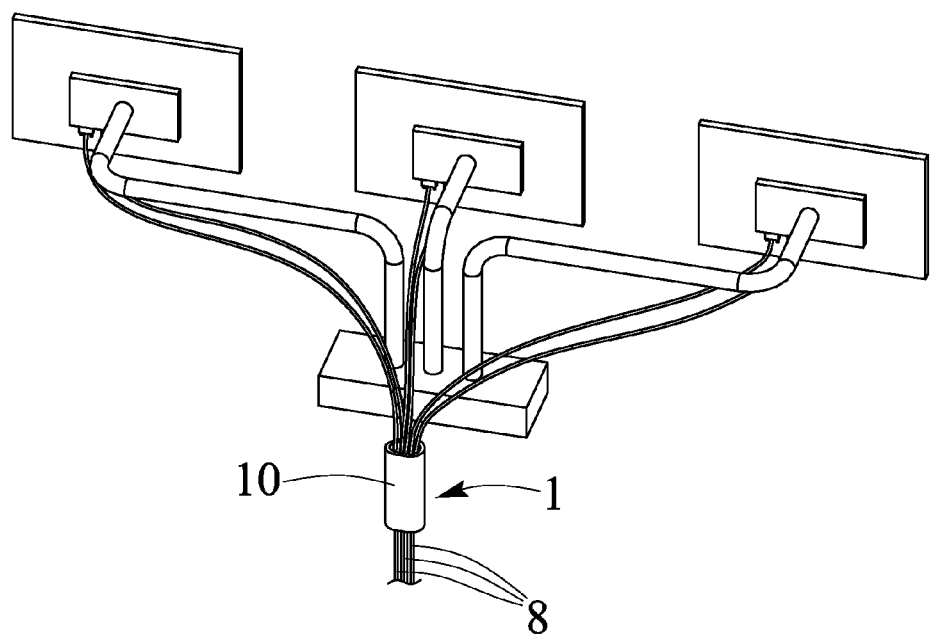
F I G. 2

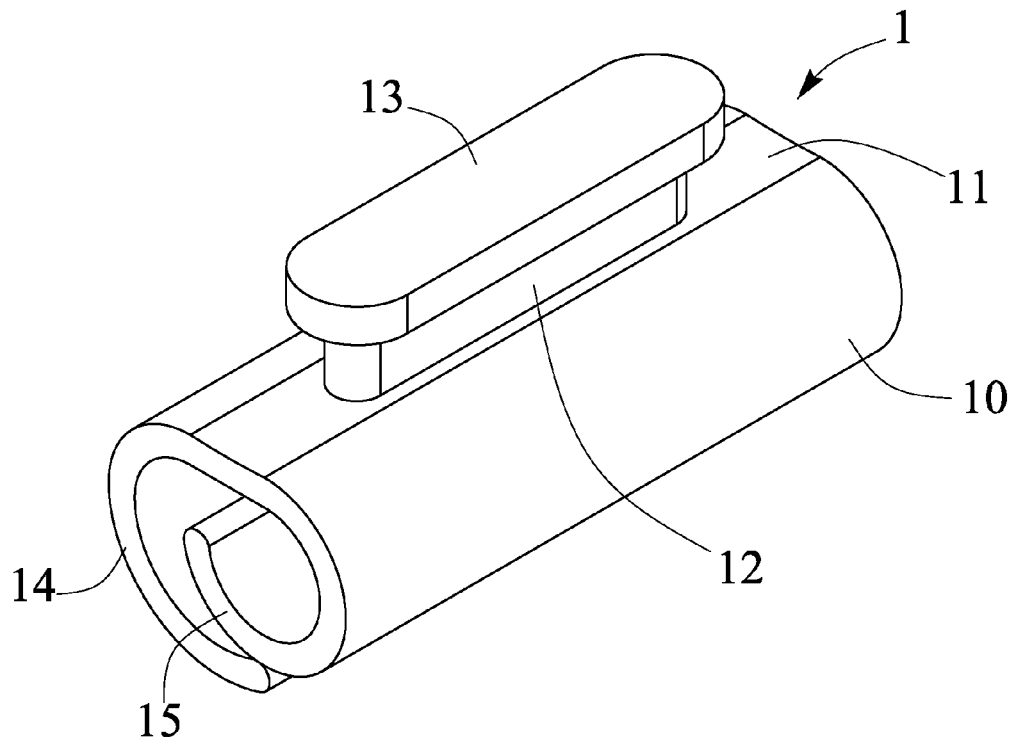
F I G. 3
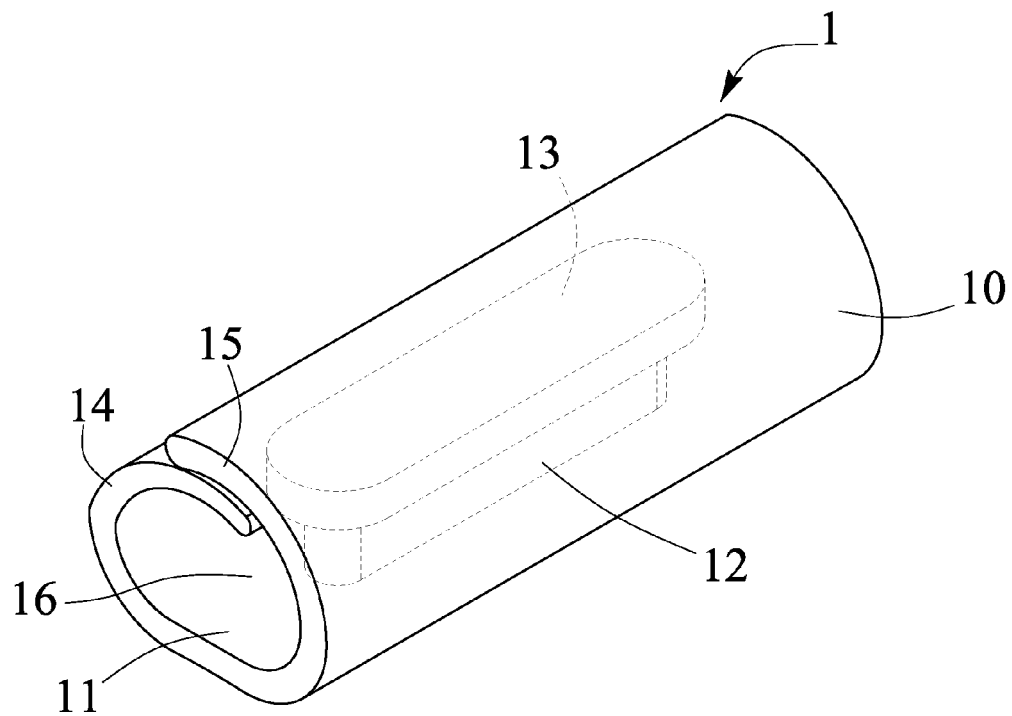
F I G. 4

CABLE ORGANIZING APPARATUS

BACKGROUND OF THE INVENTION

1. Field of the Invention

The present invention relates to a cable organizing apparatus, and more particularly to a cable organizing apparatus including an improved structure or configuration for solidly and stably winding and storing and organizing one or more wires or cables therein and for preventing the wires or cables from being disengaged or separated from the cable organizing apparatus.

2. Description of the Prior Art

Typical cable organizer or organizing devices comprise a casing or housing having a plate or wall member which includes one or more openings or orifices or notches formed therein for receiving or engaging with the wires or cables and for winding and storing and organizing the wires or cables therein and for preventing the wires or cables from being disengaged or separated from the cable organizing apparatus.

For example, U.S. Pat. No. 4,721,268 to Lerner et al., U.S. Pat. No. 6,736,669 to Martin et al., U.S. Pat. No. 7,433,571 to Kendricks, U.S. Pat. No. 7,446,260 to Hammonds, U.S. Pat. No. 7,607,618 to Mori et al., U.S. Pat. No. 7,882,660 to Kitagawa, and U.S. Pat. No. 8,076,584 to Huang et al. disclose several of the typical cable organizing apparatuses each comprising a casing or housing having a compartment or chamber or one or more openings or orifices or notches formed therein for receiving or engaging with the wires or cables and for winding and storing and organizing the wires or cables therein and for preventing the wires or cables from being disengaged or separated from the casing or housing of the cable organizing apparatus.

However, the wires or cables may only be randomly or loosely received or engaged within the casing or housing of the cable organizing apparatus and may not be solidly and stably anchored or retained or positioned within the casing or housing, and may have a good chance to be disengaged from the casing or housing inadvertently.

The present invention has arisen to mitigate and/or obviate the afore-described disadvantages of the conventional cable organizing apparatuses.

SUMMARY OF THE INVENTION

The primary objective of the present invention is to provide a cable organizing apparatus including an improved structure or configuration for solidly and stably winding and storing and organizing one or more wires or cables therein and for preventing the wires or cables from being disengaged or separated from the cable organizing apparatus, and for allowing the cable organizing apparatus to be easily carried with the user.

The other objective of the present invention is to provide a cable organizing apparatus including an improved structure or configuration for easily and quickly winding or engaging one or more cables onto one or more posts and for solidly and stably retaining the cables on the posts and for preventing the cables from being disengaged or separated from the posts.

In accordance with one aspect of the invention, there is provided a cable organizing apparatus comprising a housing member including a base member, and including one or more posts extended from the base member, and including one or more flaps extended outwardly from the base member and foldable relative to the base member for forming and defining a chamber in the flaps of the housing member and for receiving and accommodating the post within the chamber in the flaps of the housing member, and a cable engageable onto the post, and the flaps are foldable relative to the base member for accommodating the post and the cable within the chamber in the flaps of the housing member and for preventing the cable from being disengaged from the post.

The housing member includes an enlarged head formed or provided on top of the post for anchoring the cable on the post and for preventing the cable from being disengaged or separated from the post.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a perspective view illustrating the operation of a cable organizing apparatus in accordance with the present invention;

FIG. 2 is a partial perspective view illustrating the operation of the cable organizing apparatus;

FIG. 3 is another perspective view of the cable organizing apparatus, at an opened condition or status;

FIG. 4 is a further perspective view of the cable organizing apparatus, at a folded condition or status;

DETAILED DESCRIPTION OF THE PREFERRED EMBODIMENT

Figure 5:
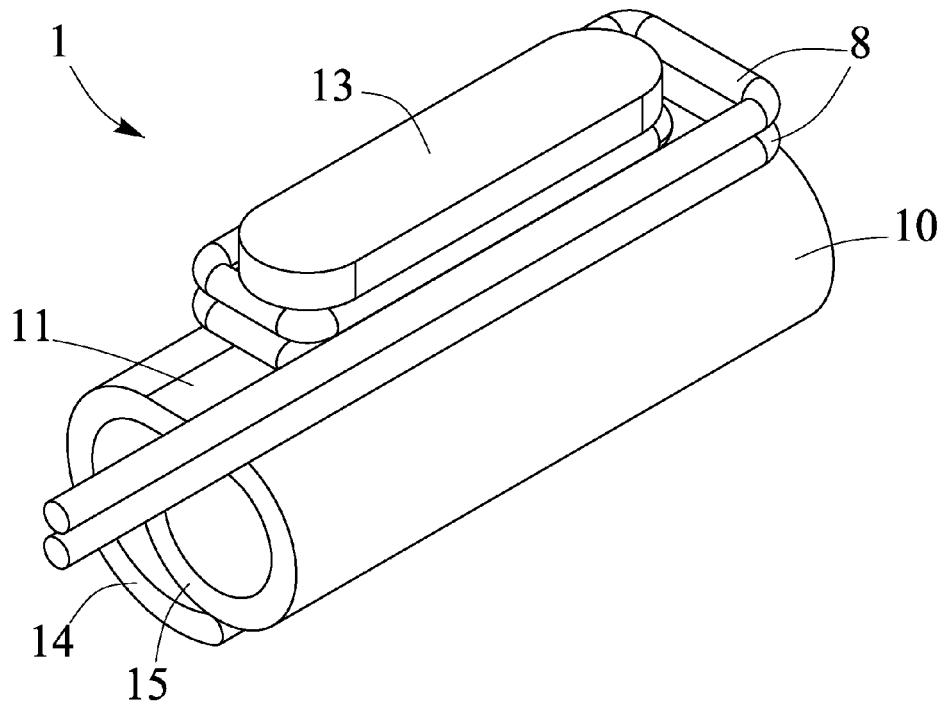
FIGS. 5, 6 are still further perspective views illustrating the operation of the cable organizing apparatus.
Figure 7:
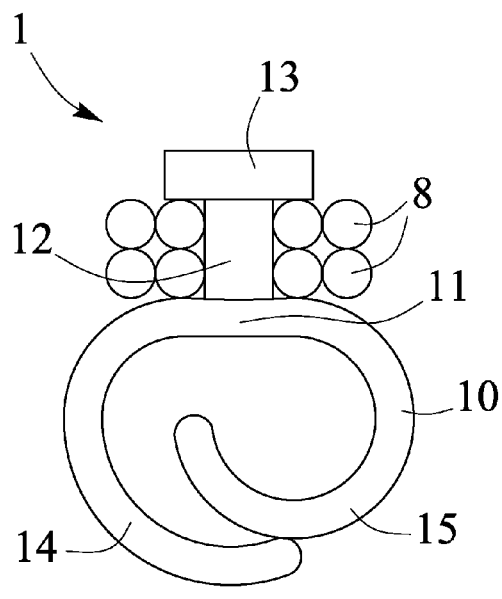
FIGS. 7, 8 are end plan schematic views of the cable organizing apparatus as shown in FIGS. 5 and 6 respectively.
Figure 8:
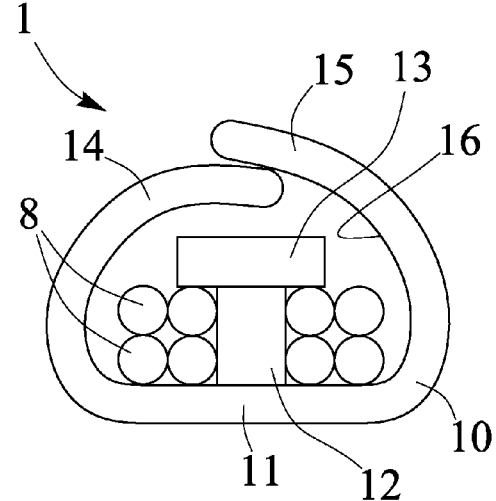

Referring to the drawings, and initially to FIGS. 1 and 2, a cable organizing apparatus 1 in accordance with the present invention is provided for winding and storing and organizing one or more wires or cables 8 together therein and for preventing the cables 8 from being disengaged or separated from the cable organizing apparatus 1, and comprises a receptacle or housing member 10 including a lower or bottom portion or panel or base member 11 (FIGS. 3-5, 7-8), and a peg or column or protrusion or post 12 extended upwardly from the base member 11 for winding or engaging with the cables 8 (FIGS. 5, 7-8). It is preferable that the housing member 10 includes an enlarged anchoring head 13 formed or provided on top of the post 12 for solidly and stably anchoring or retaining or positioning the cables 8 on the post 12 and for preventing the cables 8 from being disengaged or separated or removed from the post 12.

Figure 6:
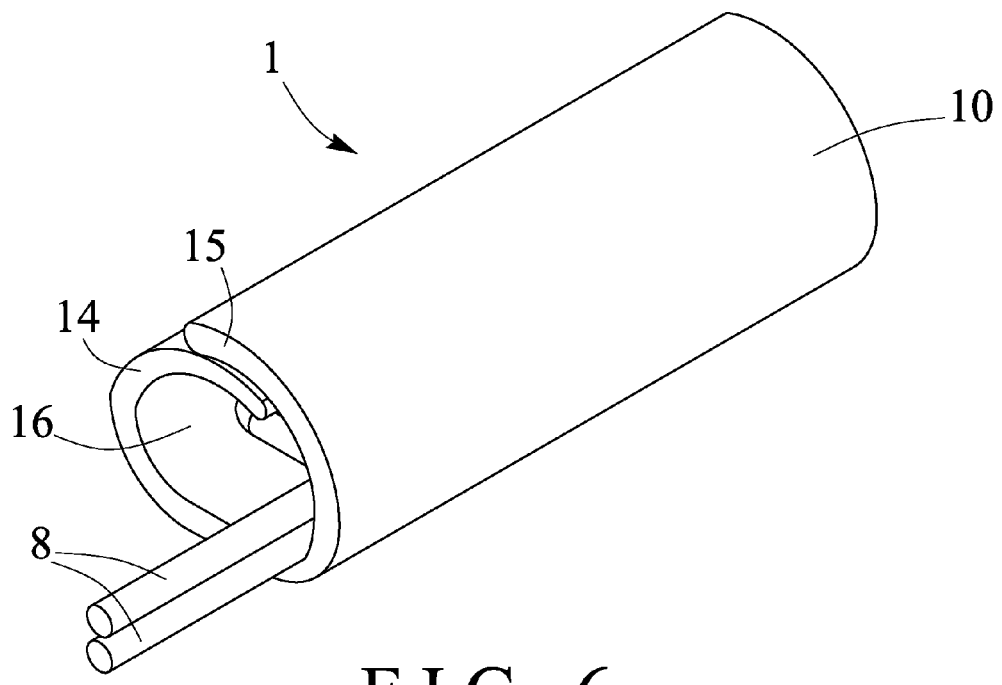

The housing member 10 further includes one or more (such as two) side panels or wings or flaps 14, 15 laterally and oppositely extended outwardly from the side portions of the base member 11 and foldable relative to the base member 11 of the housing member 10 for forming or defining a compartment or chamber 16 in the flaps 14, 15 of the housing member 10 (FIGS. 4, 6, 8) when the flaps 14, 15 are folded upwardly and toward each other, and for receiving or accommodating or engaging with the post 12 and the cables 8 (FIGS. 6, 8) and for preventing the cables 8 from being disengaged or separated or removed from the post 12. The housing member 10, particularly the flaps 14, 15 of the housing member 10 are made of soft or resilient materials for allowing the flaps 14, 15 of the housing member 10 to be folded relative to the post 12 and the base member 11 of the housing member 10.

As shown in FIGS. 3, 5, and 7, before folding, it is preferable that the flaps 14, 15 of the housing member 10 are curved and folded downwardly and outwardly away from the post 12 and/or the cables 8 for allowing the post 12 to be exposed and thus for allowing the cables 8 to be easily and quickly wound or engaged onto the post 12. After the cables 8 have been wound or engaged onto the post 12, the flaps 14, 15 of the housing member 10 may then be curved and folded upwardly and toward each other (FIGS. 6, 8) in order to form or define the chamber 16 in the flaps 14, 15 and so as to receive or accommodate or cover or contain the cables 8 within the chamber 16 in the flaps 14, 15 of the housing member 10, and thus to prevent the cables 8 from being disengaged or separated or removed from the post 12.

In operation, as shown in FIGS. 1 and 2, the cables 8 may be easily and quickly wound or engaged onto the post 12 (FIGS. 5, 7), and the flaps 14, 15 of the housing member 10 may then be curved and folded upwardly and toward each other to form the chamber 16 in the flaps 14, 15 (FIGS. 6, 8) and to accommodate and contain the cables 8 within the chamber 16 in the flaps 14, 15 of the housing member 10, and to prevent the cables 8 from being disengaged or separated or removed from the post 12, and thus for allowing the cables 8 to be suitably and solidly and stably anchored or retained or positioned and accommodated and contained and organized within the chamber 16 formed by the flaps 14, 15 of the housing member 10.

Figure 9:
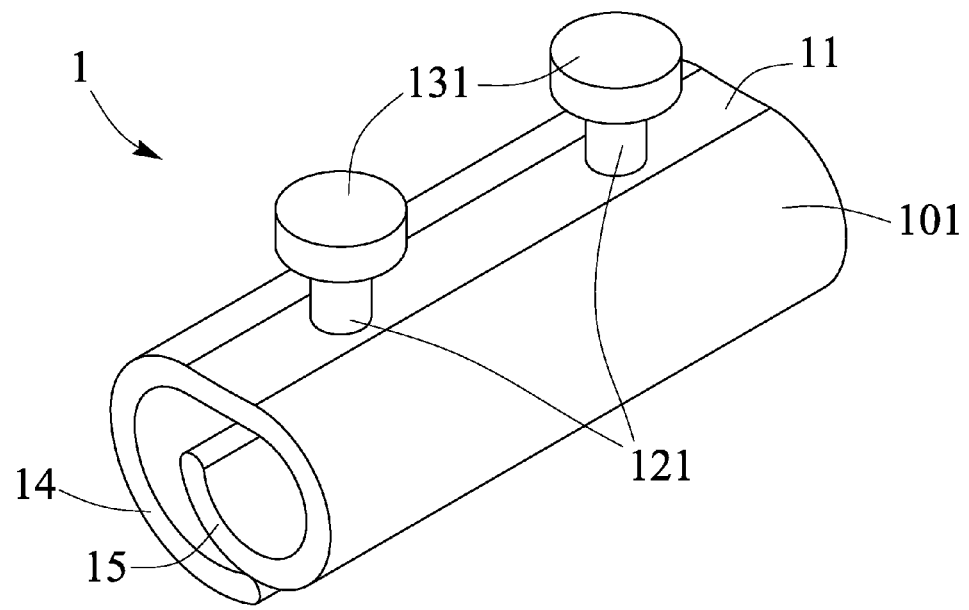
FIG. 9 is a still further perspective view illustrating the other arrangement of the cable organizing apparatus.

Alternatively, as shown in FIG. 9, the housing member 101 may include one or more (such as two) posts 121 extended upwardly from the base member 11 for winding or engaging with the cables, and the housing member 101 also include an enlarged anchoring head 131 formed or provided on top of each of the posts 121 for solidly and stably anchoring or retaining or positioning the cables on the posts 121 and for preventing the cables from being disengaged or separated or removed from the posts 121.

Accordingly, the cable organizing apparatus in accordance with the present invention includes an improved structure or configuration for solidly and stably winding and storing and organizing one or more wires or cables therein and for preventing the wires or cables from being disengaged or separated from the cable organizing apparatus.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cable organizing apparatus comprising:
a housing member including a base member, and including at least one post extended from said base member, and including at least one flap extended outwardly from said base member and foldable relative to said base member for forming and defining a chamber in said at least one flap of said housing member and for receiving and accommodating said at least one post within said chamber in said at least one flap of said housing member, and
a cable engageable onto said at least one post, and
said at least one flap being foldable relative to said base member for accommodating said at least one post and said cable within said chamber in said at least one flap of said housing member and for preventing said cable from being disengaged from said at least one post.

2. The cable organizing apparatus as claimed in claim 1, wherein said housing member includes an enlarged head formed on said at least one post for anchoring said cable on said at least one post and for preventing said cable from being disengaged from said at least one post.

3. A cable organizing apparatus comprising:
a housing member including a base member, and including at least one post extended from said base member, and including two flaps laterally and oppositely extended outwardly from said base member and foldable relative to said base member for forming and defining a chamber in said flaps of said housing member and for receiving and accommodating said at least one post within said chamber in said flaps of said housing member, and
a cable engageable onto said at least one post, and
said flaps being foldable relative to said base member for accommodating said at least one post and said cable within said chamber in said flaps of said housing member and for preventing said cable from being disengaged from said at least one post.

4. The cable organizing apparatus as claimed in claim 3, wherein said housing member includes an enlarged head formed on said at least one post for anchoring said cable on said at least one post and for preventing said cable from being disengaged from said at least one post.

\* \* \* \* \*